United States Patent
Thornton et al.

(10) Patent No.: US 6,535,884 B1
(45) Date of Patent: Mar. 18, 2003

(54) SYSTEM, METHOD AND ARTICLE OF MANUFACTURE FOR PROVIDING AN ATTRIBUTE SYSTEM WITH PRIMITIVE SUPPORT OF DYNAMIC AND EVOLVABLE ROLES IN SUPPORT OF FLUID AND INTEGRATIVE APPLICATION DEVELOPMENT

(75) Inventors: James D. Thornton, Redwood City, CA (US); Paul M. Aoki, Foster City, CA (US); Ian E. Smith, San Francisco, CA (US); W. Keith Edwards, San Francisco, CA (US); Thomas K. Rodriguez, San Francisco, CA (US); Karin Petersen, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 76 days.

(21) Appl. No.: 09/614,046

(22) Filed: Jul. 11, 2000

(51) Int. Cl.$^7$ .............................. G06F 17/30
(52) U.S. Cl. ....................... 707/100; 707/101
(58) Field of Search ................. 707/100, 101, 707/102, 104, 10, 9; 709/223; 705/7

(56) References Cited

U.S. PATENT DOCUMENTS

| | | | | |
|---|---|---|---|---|
| 5,987,422 A | * | 11/1999 | Buzsaki | 705/7 |
| 6,161,139 A | * | 12/2000 | Win et al. | 709/223 |
| 6,202,066 B1 | * | 3/2001 | Barkley et al. | 707/9 |
| 6,286,104 B1 | * | 9/2001 | Buhle et al. | 707/10 |

* cited by examiner

*Primary Examiner*—Sanjiv Shah (57) ABSTRACT

A system, method and article of manufacture are provided for managing data items. One or more roles are defined with each role comprising a set of attributes. The roles may then be then associated with zero, one, or more data items. The data item may be assigned a value for each of the attributes of the role(s) that have been associated with the data item.

20 Claims, 6 Drawing Sheets

SYSTEM, METHOD AND ARTICLE OF MANUFACTURE FOR PROVIDING AN ATTRIBUTE SYSTEM WITH PRIMITIVE SUPPORT OF DYNAMIC AND EVOLVABLE ROLES IN SUPPORT OF FLUID AND INTEGRATIVE APPLICATION DEVELOPMENT

FIELD OF THE INVENTION

The present invention relates generally to information management and, more particularly, to management of information in electronic documents including electronic mail ("e-mail").

BACKGROUND OF THE INVENTION

More and more applications have the requirement to store information about the information they handle. Such "information about information" is commonly known as metadata. Metadata can be as simple as the size of a file or as complex as the entire engineering history of a computer-aided design component.

There are several ways in which current systems represent metadata. Attributes, or properties, are a common way of representing metadata. The other common approach is to use conventional database management systems to store the metadata as structured data. More recently, so-called semi-structured data techniques (typically based on the standard Extensible Markup Language, XML) have been applied. We now discuss each in turn.

Direct system support for attribute-structured metadata is not new. File systems have traditionally managed and exposed file and directory metadata. Some recent consumer computer products, such as the BeOS file system (BeFS) and the Windows 2000 file system (formerly NTFS 5.0), support arbitrary attributes assigned by user-written applications. Directory servers (e.g., LDAP servers) support attributes for entries like employees, printers, offices, etc. WebDAV, an extension to HTTP, allows arbitrary properties to be associated with HTTP resources and these properties to be stored at a web server and later retrieved through queries. More document-specific application infrastructure software, such as search engines (e.g., Verity) and corporate portals (e.g., Plumtree), allow attributes to be associated with the documents they handle. Finally, description logics, which have been used as knowledge inference tools, have relied on attributes as the basis to make inferences about concepts and particular instances of concepts.

Database systems have traditionally provided support to manage an application's structured information. The primitives to handle the information and the degree of structure provided vary somewhat between the two most common types of database systems, relational database management systems (RDBMS), and object-oriented database management systems (OODBMS). However, both RDBMSs and OODBMSs are generally used to build applications where the structure of the tuples or objects needed for the application are well-understood before the application is deployed. The structure, or schema, is defined through some data definition mechanism and then strongly enforced at run-time.

More recently, semi-structured database management systems have begun to support persistent storage for information that has some identifiable, but possibly deeply-nested, structure which does not necessarily need to be defined in advance. A substantial part of the effort in developing semi-structured databases has gone into dealing with.queries over the evolving, deeply-nested structures. One particular application of XML databases is for documents, whose structure is defined by a DTD (document type definition). Another application seems to be in support of website definition, where the evolving structure of the database results from changes made by website managers to provide different ways for navigating the site.

A few examples of where costs and difficulties reside in current systems:

Plumtree's deployment manual says: define all attributes before populating the portal, since adding one new property definition requires the whole portal to be re-indexed.

Verity also needs to re-index every document upon addition of a new attribute to a server, it is not even specific to document types.

For most of these systems, changes in the type, names or number of attributes managed by the system have to be introduced by system administrators, not application developers. In fact, schema changes in an RDBMS are costly and not performed often in practice. Object-oriented databases require support for type/class evolution of stored objects, which is uniformly poorly-supported. More document-centric infrastructure systems, like those provided by Plumtree and Verity, also only allow system administrators to add attributes to the system (and then incurs in the re-indexing costs described before.)

WebDAV, on the other hand, supports a much more flexible and dynamic model of how attributes can be attached to HTTP resources, however they force a partition of the property space that will not support fluid integration overtime. For example, if a number of attributes exist on a resources, e.g., author and subject, a new application wishing to reuse those attributes in addition to an attribute named distributionList, to create an "electronic update" service cannot just combine these three attributes into UpdateService (author, subject and distributionList) without affecting other applications and reusing and leveraging exactly the pre-existing fields.

XML databases support easy addition of new branches in the tree structure (or new links in the graph). For example, adding a new element to a particular person element, within a particular office element, in a particular organization element, where the new element represents a "temporary replacement" is supported by XML databases. However, XML databases do not support recasting of elements for a different purpose very effectively. For example, if you want to re-use some elements and add new ones into a group element, this can require quite a bit of work: first each of the elements to be reused needs to have an object identifier explicitly stated in the structure—if the creators did not add one you may be out of luck; second, the re-used elements are actually of a different kind than the newly created ones. That said, there is a distinction between the original semi-structured data work and the actual XML implementations.

While RDBs and OODBs enforce strong typing of each object and attribute, WebDAV and XML databases do not, which requires type checking by the application each time a value is retrieved with a query. Therefore, the flexibility of WebDAV and XML databases comes at a cost of constant correctness checking when developing applications against them.

Relational databases, although able to handle individual items (in relational database design terms, entities that are represented by unique keys), their existence independent of relationships specified through additional attributes in tuples, including the unique key, is not as useful. However, because of the networked nature of today's intranets and the Internet, more and more items have some representation external to the system storing meta-information and the item can be quite meaningful to the content of the database independently of whether and how many or how few attributes are specified for it. OODBs, semi-structured DBs, and directory servers are very similar to RDBs in this way. Primitive support to access external information related to the item if needed is important particularly for document-centric applications, and is not inherently supported by many of these systems.

WebDAV, Verity and Plumtree, because of their more Web- or document-centric nature, do provide support for independent items that may exist completely independently from their attributes. For example, web pages in WebDAV have meaning independent of their attributes. However, these systems provide much less support for application development. They provide limited support for maintaining consistency of the attributes and they provide very little support for attribute evolution.

SUMMARY OF THE INVENTION

A system, method and article of manufacture are provided for managing data items. One or more roles are defined with each role comprising a set of attributes. The roles may then be then associated with zero, one, or more data items. The data item may be assigned a value for each of the attributes of the role(s) that have been associated with the data item.

In one aspect of the present invention, the set of attributes of a role may comprise one or more attributes. In an additional aspect of the present invention, roles may have one or more attributes in common with each other.

The data item may also have one or more attributes not included in the set of attributes of the role(s) associated with the data item. In another aspect of the present invention, the data item may have at least one attribute associated with it prior to the associating of the one or more roles to the data item. Also, the associating of one or more roles to the data item may further include the making of a determination as to whether the data item has one or more attributes in common with the set of attributes of the role.

In one embodiment of the present invention, the addition of one or more attributes to the data item may be permitted subsequent to the assigning of the role to the data item. In a further embodiment, the creating of an alias for at least one of the attributes of the set of attributes of the role may be permitted. In another embodiment of the present invention, the values assigned to the data item may be stored in a database. In such an embodiment, the values of all of the attributes of a role may be retrieved from the database upon receipt of a query for one of the attributes of the respective role.

BRIEF DESCRIPTION OF THE DRAWINGS

The foregoing and other objects, aspects and advantages are better understood from the following detailed description of a preferred embodiment of the invention with reference to the drawings, in which.

DETAILED DESCRIPTION

Embodiments of the present invention involve a system with high level primitives for items and their attributes, where sets of attributes can play distinguished roles that may be enforced at run-time and may evolve fluidly over time. Each of these qualities may be used to support effective application development, especially those applications involving documents or other information residing externally to the attribute system. Furthermore, the following description focuses on tools that can lend themselves to efficient storage layout and query optimizations that may help result in a high-performance attribute-system.

Application development based on multiple, fluid attributes and support for distinguished roles, that are enforced at run-time has several advantages:

It enables descriptive/keyword storage and retrieval of the items managed by the applications, not necessarily just "name-based" storage and retrieval.

It enables easy association of items with context that increases the value of the item in the application.

It enables the integration of multiple applications (we also call it application confederation) because any item may play different distinguished roles, for each of the applications that it may be a participant of.

It supports evolutionary application development in that meta-information can evolve with the need of one or more applications, by evolving the metadata structures.

By enforcing type safety and constraints over the use of the attributes and distinguished roles, the overhead of error checking imposed on the application developer is significantly reduced (compared with some of the more fluid systems that exist today).

The present system supports more fluid and easier evolution of structured information (through distinguished roles or attribute groups) than traditional DBMSs and OODBMSs do.

The present invention supports stricter typing and consistency of data than WebDAV and XML databases.

The present system supports a more integrative attribute model than WebDAV, and hence supports easier leverage of attributes across applications than WebDAV.

The present system supports the co-existence of structured attributes (distinguished roles) and non-structured attributes, which are those that exist independently of any distinguished role.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 1, which illustrates a typical hardware configuration of a workstation in accordance with a preferred embodiment having a central processing unit 110, such as a microprocessor, and a number of other units interconnected via a system bus 112.

Figure 1:
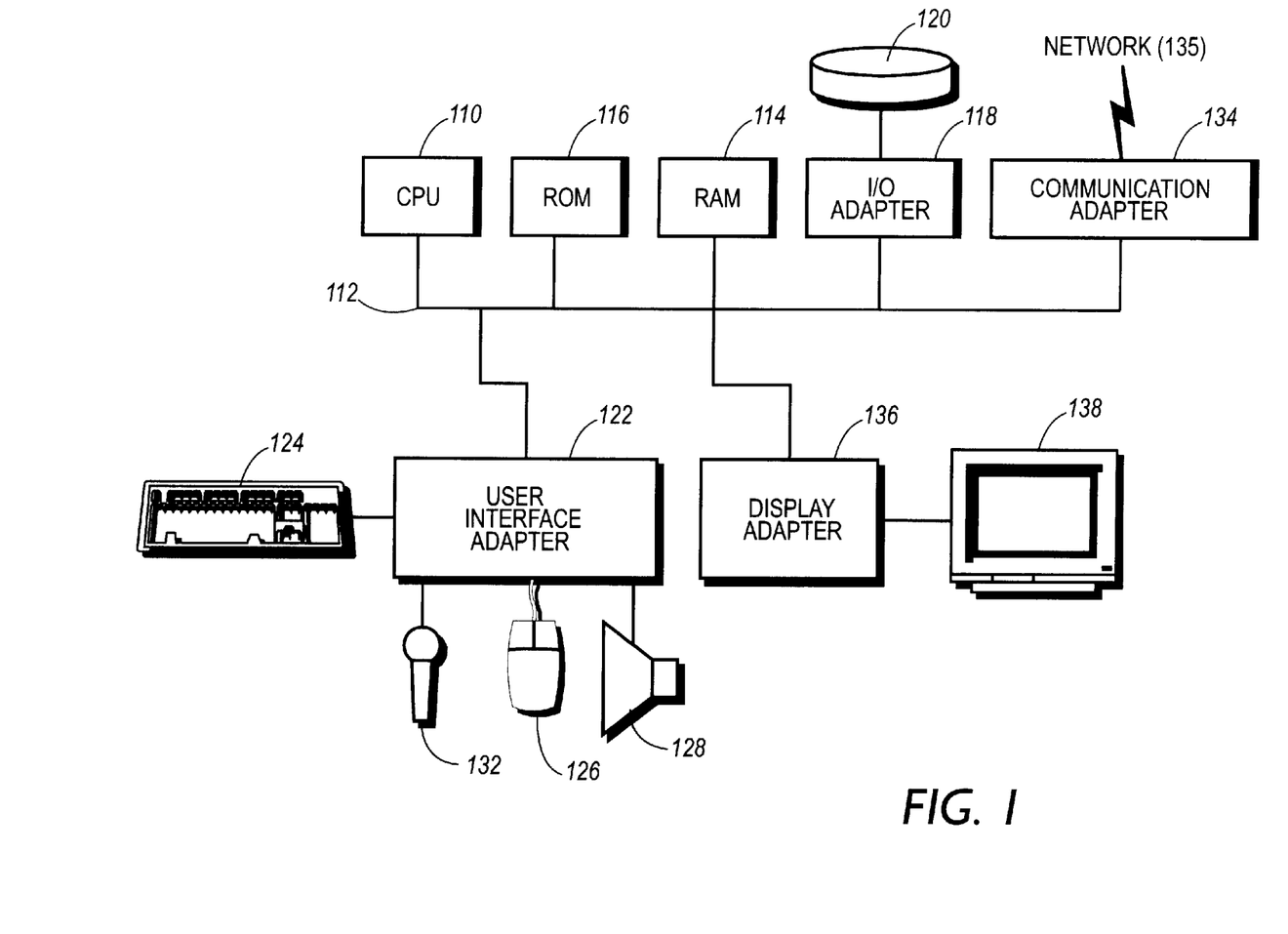
FIG. 1 illustrates a representative hardware environment in accordance with one embodiment of the present invention.

The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network 135 (e.g., a data processing network) and a display adapter 136 for connecting the bus 112 to a display device 138.

The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned. An embodiment may be written using JAVA, C, and the C++ language and may utilize object oriented programming methodology.

Figure 2:
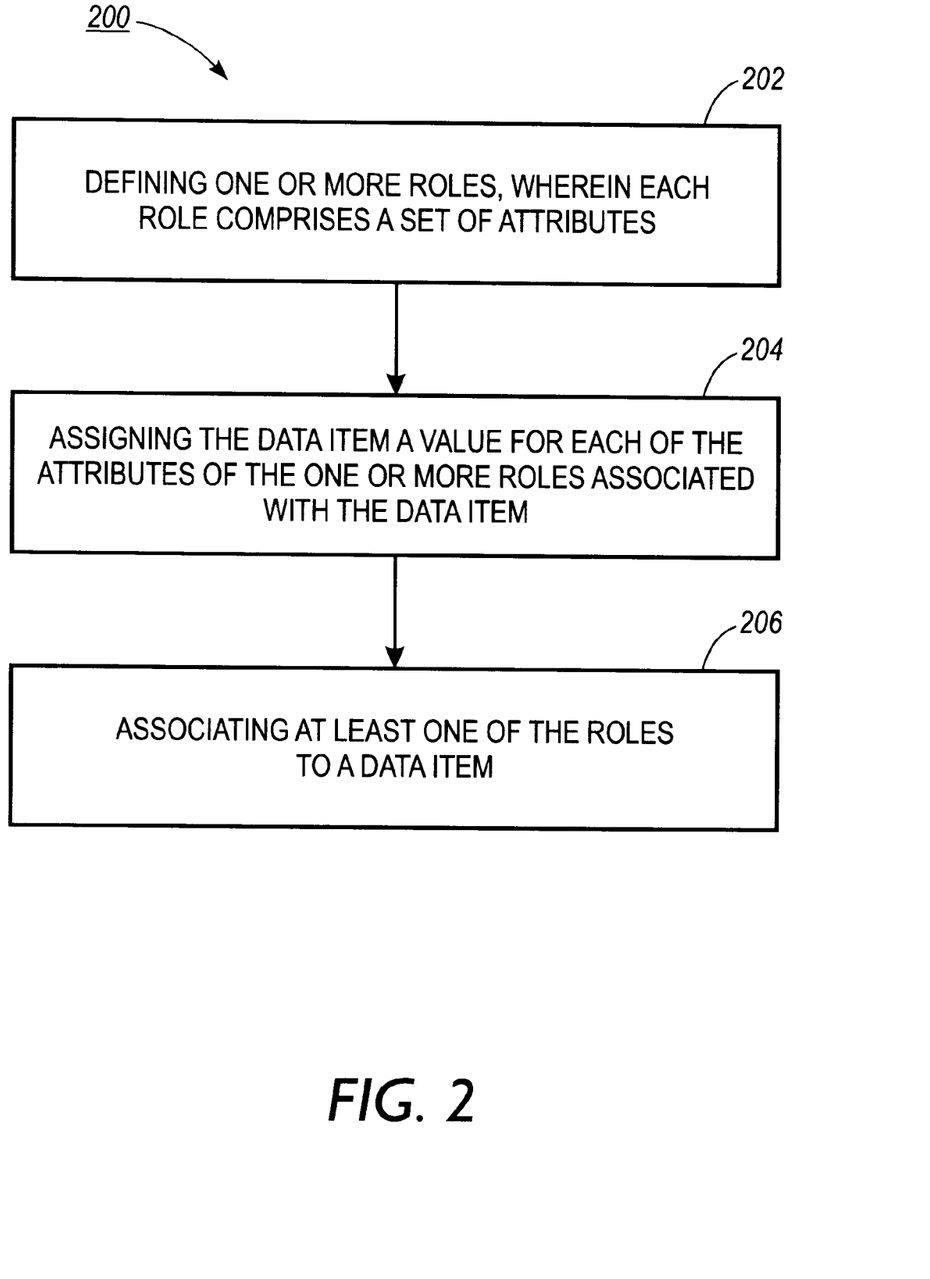
FIG. 2 is a flowchart of a process for setting up roles in accordance with an embodiment of the present invention.

FIG. 2 is a flowchart of a process 200 for setting up roles in accordance with an embodiment of the present invention. In operation 202, one or more roles are defined with each role comprising a set of attributes. In operation 204, at least one of the roles is then associated with a data item. In operation 206, the data item is assigned a value for each of the attributes of the role(s) that have been associated with the data item.

Under this process, three elements are introduced: data items, attributes, and roles. A data item (or simply, an "item") may exist independently of either attributes or attribute groups, and which may have external content associated with them. For example, a document or web-pages are items. However, an object called a security-policy, which may not have any external information associated with it can also be an item. Such an item may be used for programming reasons to store additional information for the application. An attribute is a property or metadata that can be associated with an item. In that sense, attributes may not exist independently. Attributes can be of any type and any number of them can be associated with a particular item. Attributes may also be attached to an item at any time, without the need of a system administrator. Attributes may also be grouped to define into an attribute group which may be used to define a role. Attribute-group-definitions may be referred to a "schema" for a distinguished role. An example of some attribute groups are as follows:

A Pim group can be a distinguished attribute group defined as follows:

Pim=group of
  subject: type String
    //what is the meeting about
  day: type Date
    //what date is it on
  time: type Time
    //what time is it An Email group can be a distinguished attributed group defined as:

Email=group of
  subject: type String
    //what is the email about
  from: type String
    //who sent it
  date: type String
    //when was it sent
  to: type String
    //to whom was it sent A web page group can be defined as:
Web=group of
  title: type String
    //title of web-page
  lastModified: type Date
    //when the web-page was last
    //modified A role (or "distinguished role") comprises a set of attributes and has the following characteristics: fluidity, multiplicity, and enforcement. In particular, a role can evolve in a lightweight manner over time (i.e., "fluidity") and supports the automatic maintenance of certain structural invariants at run-time (i.e., "enforcement"). Additionally, more than one role can be assigned to an item (i.e., "multiplicity").

FLUIDITY

Figure 3:
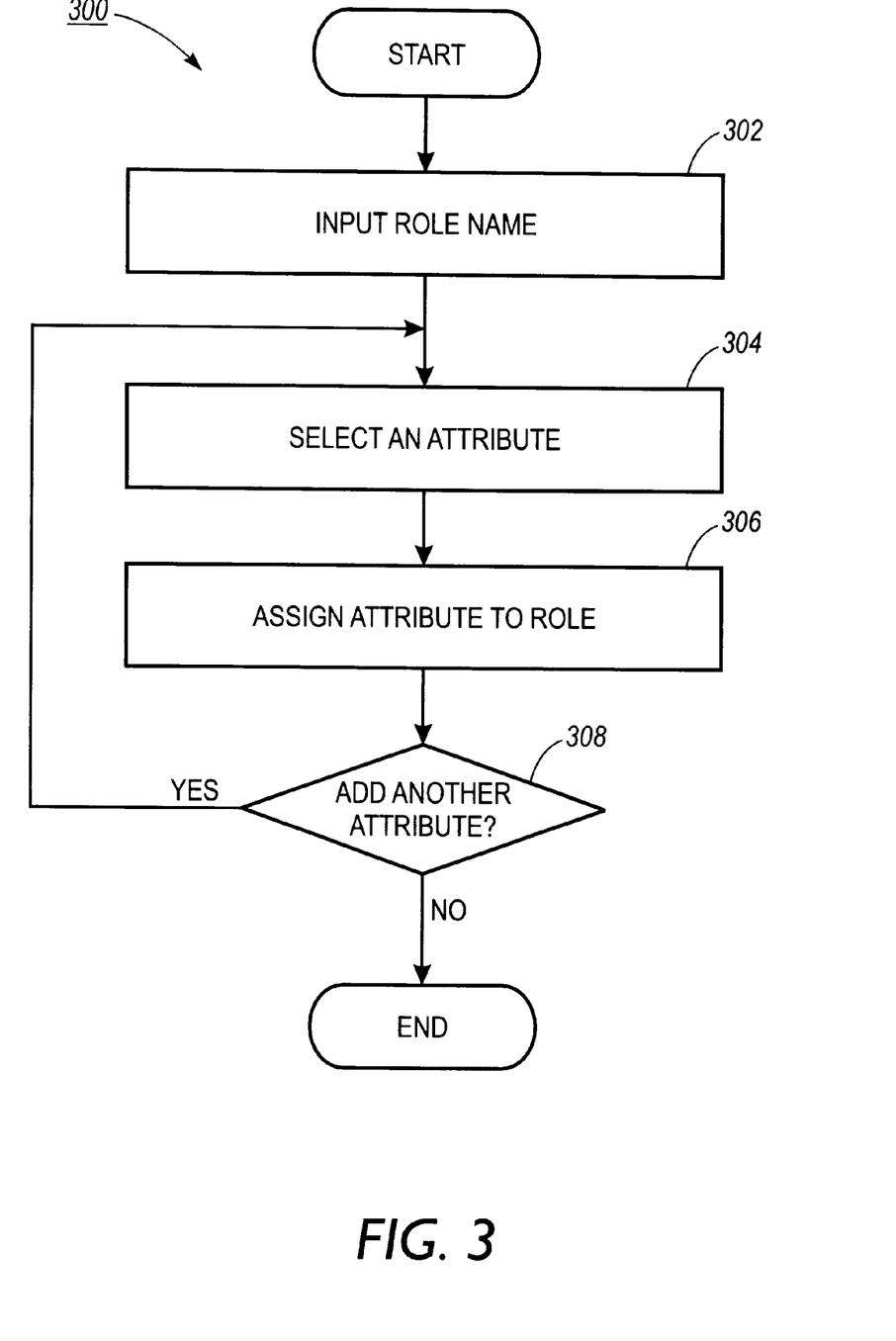
FIGS. 3–6 are flowcharts for an illustrative process for defining a role in accordance with an embodiment of the present invention.
Figure 4:
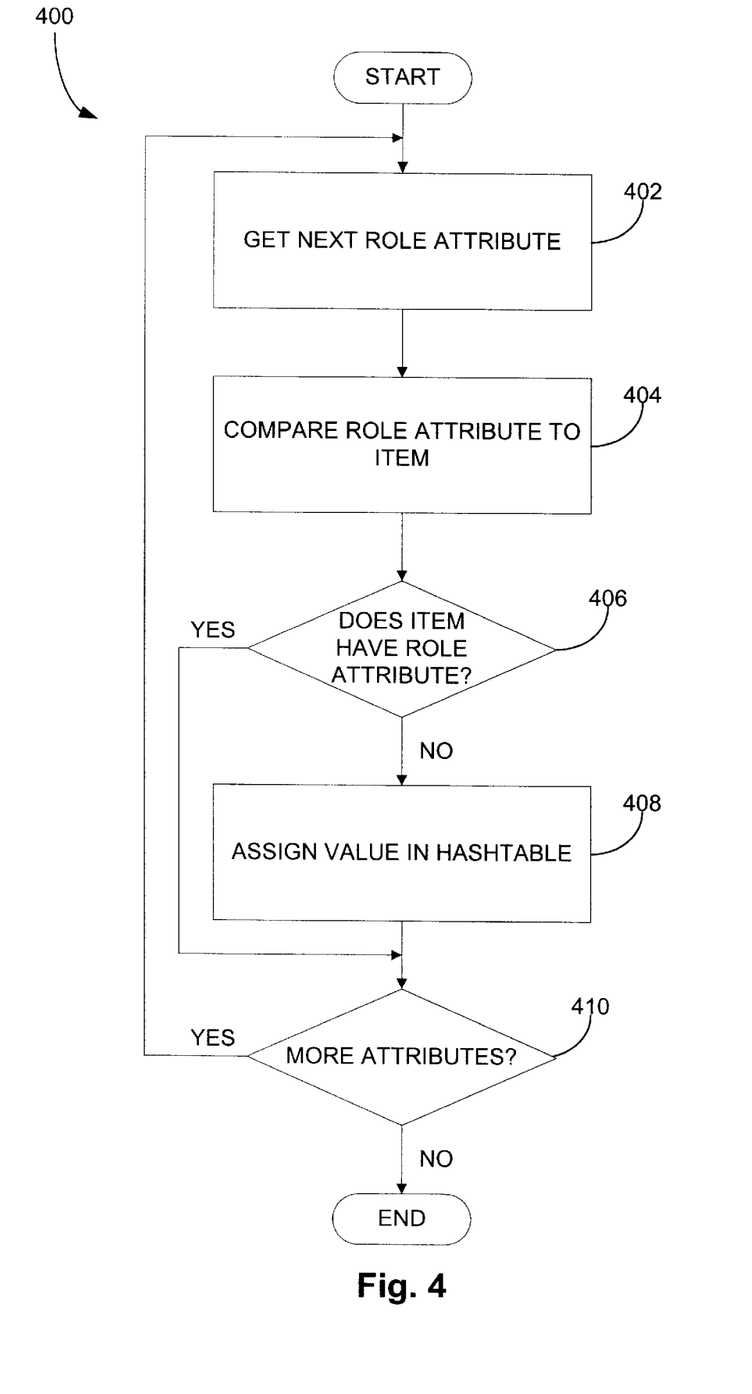
Figure 5:
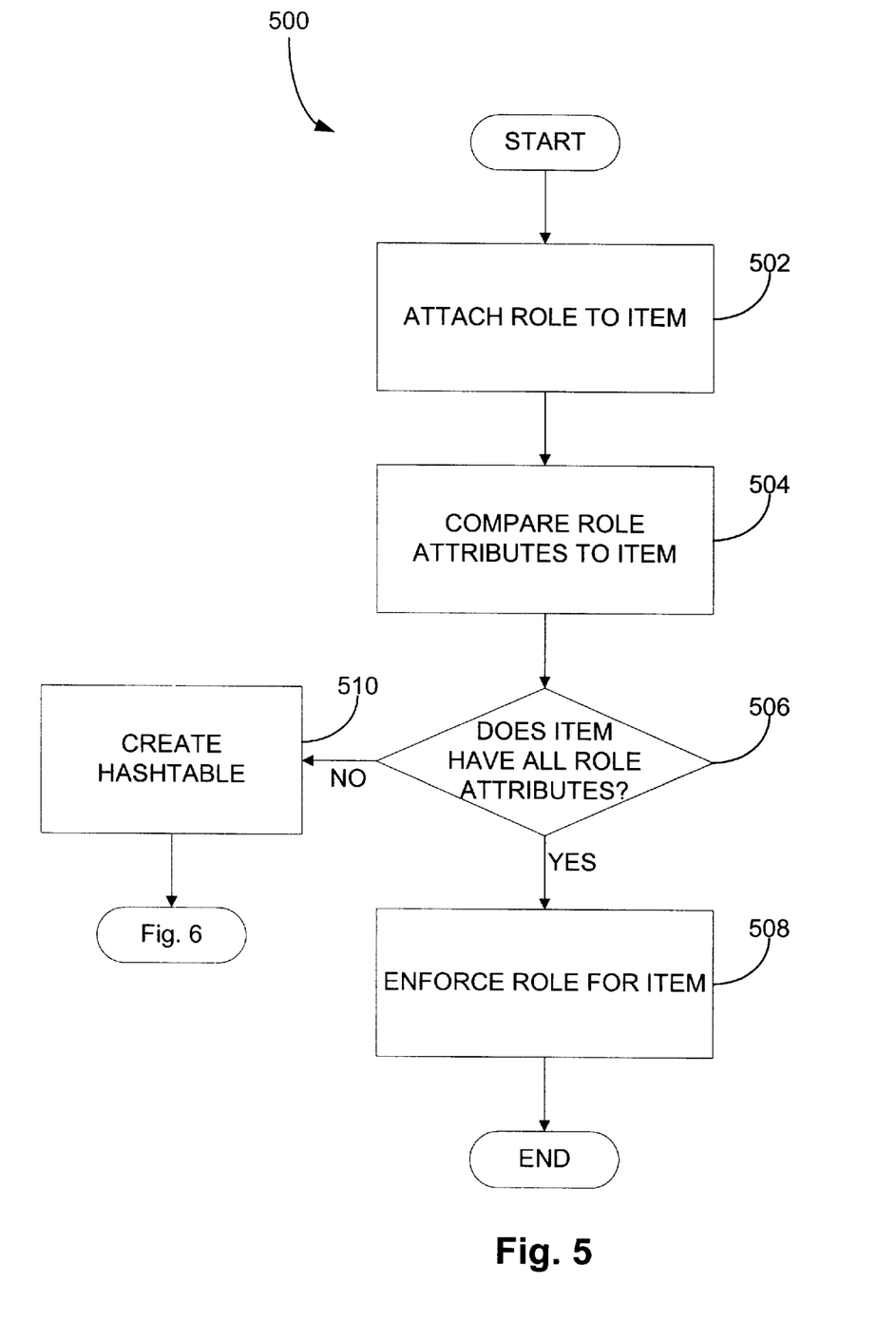
Figure 6:
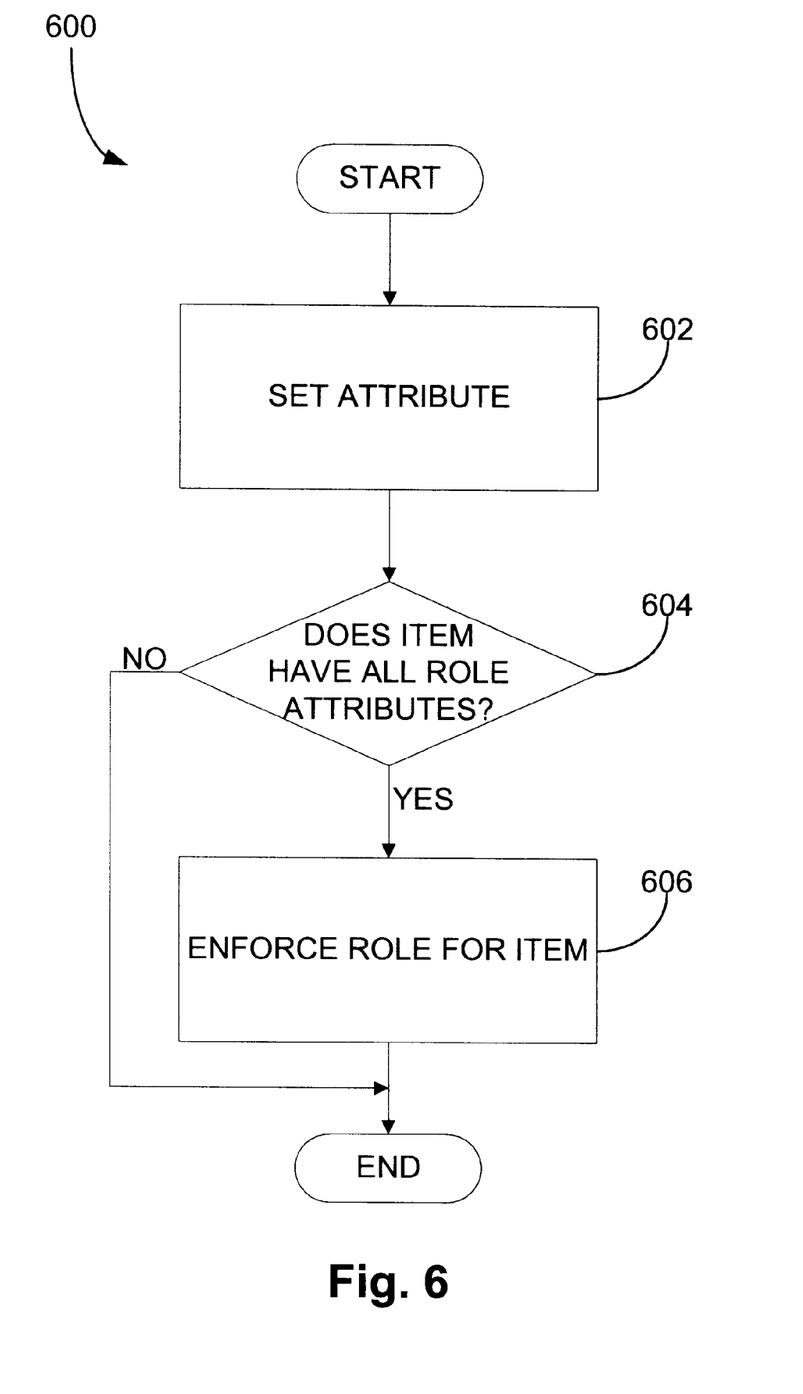

As part of its fluidity characteristic, a role may be created or defined at any point or time. In order to create a role, all that may be needed is the specification of the name and types of attributes that should be grouped to define the schema of the particular role. FIG. 3 is a flowchart for an illustrative process 300 for defining a role in accordance with an embodiment of the present invention. In operation 302, a name for the role being defined may be defined. A role may be defined either by a unit, code, possibly by a description in some formal language such as a programming language. Once the name has been defined, attributes may be selected and assigned to the role either one at a time (see operations 304, 306, and decision 308) or by groups or sets.

An illustrative API call defining a role may comprise:

createRole(AttributeDescriptor d[ ]), where an AttributeDescriptor is an <attribute name, attribute type/class> pair creating an array of attribute descriptors. There can be many attribute descriptors for any role. As a further option, other information about the attribute may be included in a descriptor, such as whether the particular attribute is optional. As another example, in a situation where the particular attribute has multiple values, the additional information may comprise information about the number of values the particular attribute may have.

As another part of its fluidity characteristic, a role may be assigned to an item dynamically. Specifically, an item can have one or more property groups attached to it at any time. In one embodiment of the present invention, an attribute group (i.e., the schema of a role) may be assigned to an item in an atomic way. For example, the following illustrative API call may be utilized to assign an attribute group to an item:

item.setRole(schemaName, attributeHashTable)

where schemaName is the name of the schema for the attribute group (such as, for example: Pim, Email, or Web) and attributeHashTable is a hash table containing all the values for attributes that the item does not yet hold, but needs in order to be of the schema that is being assigned. For example:

item.setRole(Pim, Hash table={subject="Project Meeting", day=1/5/2000, time=1pm})

Where the Hash table characteristic can be implied by the grouped { }.

The association of a distinguished role to an item can also occur after the necessary attributes have already been assigned to the item, either by the same application or by some other application(s). For example:

```
item.setAttribute(subject, "Project Meeting")
item.setAttribute(day, 1/15/2000)
item.setAttribute(time, 1pm)
... some time later:
  item.setRole(Pim, { })
    //all attributes have been assigned already, now
    //the distinguished role is enforced for the
    //item.
```

In fact, any combination is possible. For example, if only the subject attribute had been set already, i.e.:

```
item.setAttribute(subject, "Project Meeting")
```

... some time later:

```
item.setRole(Pim, {day=1/15/2000, time=1pm})
```

ENFORCEMENT

To support easy application development, the structure and type of attributes of an attribute group may be enforced by the system. For example, all items designated to have the Pim distinguished role, will have at least three attributes: subject, day, and time. The structure and the type of the attribute group are kept consistent for all operations on the system. For example, if an application tried to set Pim.Day to an integer value, then the system would disallow the operation. Similarly, an attempt to delete an attribute from a group would also be disallowed.

MULTIPLICITY

A single item such as, for example, a web-page, can have multiple groups assigned to it. In other words (continuing with the present example), the web page can both be part of a bookmarks application that attaches the Web attribute group, and it can also have a PIM attribute group attached to it because a user decided that the web-page is relevant to the agenda of a meeting, and the PIM application supports designating web-pages as such.

ADDITIONAL ENHANCEMENTS

Of the qualities of the attribute-system described above, fluidity and multiplicity can be further extended with one or more of the enhancements described below. These enhancements may be utilized to further increase the flexibility with which applications can be developed and evolve.

With respect to the multiplicity characteristic, items may have both attributes subject to distinguished roles and independent of distinguished roles: The behavior of attributes may be restricted by virtue of being part of a distinguished role or free of any restrictions if it is not subject of a distinguished role. These enhancement support applications that require both attributes directly managed by the application whose consistency and type requirements are important, and attributes managed, for example, by the end-user whose needs are not understood by the application and can be subject to any choices by the end user.

As an illustrative example, an application may want to support end-user classification of documents, which may allow users to attach properties like status=important, or showToMom=True. Both attribute groups can coexist with independent attributes.

Another enhancement relating to the multiplicity characteristic is that there does not have to be a limit on the number of attributes or distinguished roles associated with an item. This enhancement allows different applications to attach as many attributes as needed to an item and with the applications' budget not limited because of either the number of applications that use an item, or the number of attributes or roles any one of these applications requires.

With respect to the multiplicity characteristic, another enhancement is that attributes may be shared among property groups and sharing can occur at any time. In other words, one attribute can be part of many distinguished roles (or attribute groups). For example, when the PIM application allows the use of email messages as calendar entries, the PIM application may also re-use the subject attribute that already existed on the e-mail message. As an illustration: item 15 is an e-mail message with attributes subject, from, date and to. At some point, the e-mail distinguished role was associated with the message by invoking:

```
item15.setRole(Email, {/* all attributes there already*/})
```

To also assign the Pim role to item15 all that is needed is:

```
item15.setRole(Pim, {day=1/15/2000, time=3pm}) /*subject
    already set*/
```

Pim.Day and Pim.Time are not shared with Email, because, for example, Pim.day means the date of the scheduled event, while Email.date means the date when the message arrived. (Note that the syntax used to name the properties of particular distinguished groups is only used for convenience in the presentation, other naming possibilities are not excluded.)

Attribute sharing may be defined dynamically whenever a new distinguished role is assigned to an item. Continuing with the previous illustration, the second setRole call, which extends the behavior of the e-mail message to also become a calendar entry, can be invoked at any time:

```
item15.setRole(Pim, Hash table={day=1/15/2000, time=3pm})
```

A further enhancement via the fluidity characteristic is the designating of aliases to attributes to increase the flexibility of attribute sharing. This enhancement allows distinguished roles to refer to the same attribute value using different attribute names. Continuing with the above illustration, the Pim.subject may want to reuse the value of Web.title. This may be achieved through aliasing when the distinguished role is assigned to an item. For example, assume that item23 refers to a web-page with the title and lastModified attributes of the Web distinguished role. Aliasing could be requested as follows:

```
item23.setRole(Pim, Hash table={subject=alias_of (title), day=1/
    15/2000, time=4pm })
```

In this illustration, Pim.subject and Web.title share the same value, and queries for either subject or title attributes would match the value.

PRIMITIVE SUPPORT

Operations that relate items to attributes, distinguished roles, and even content are primitives of the system. While a variety of syntax or naming may be used for primitive operations in support of items, attributes and distinguished roles, the following operations may be part of a system using distinguished roles:

adding an attribute to an item;
retrieving the value of an attribute on an item;
grouping a set of attributes into a role;
assigning a role to an item;

query over the attributes and/or their values on items;

query over the attributes and/or values on items that have been assigned a specific role; and query for all roles assigned to an item.

While not necessary, the following primitive operations may be helpful with the handling of items that may have content or context information stored externally to the attribute system:

set the item to represent a certain external content (e.g., specify that content is stored at a particular URL); and retrieve content which will automatically use the specification of the external source, contact it, aid retrieve the content stored there.

Based on the above discussions of the characteristics of a role, the following illustrative processes may be utilized. To attach a schema of a role to an item, values are assigned for all attributes included in the respective hash table. Then a check is made to verify that every required attribute for the role is correct on the item. If the check fails, then the attempt to associate the role with the item fails with an exception.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for managing a data item, comprising:
   (a) defining one or more roles, wherein each role comprises a set of attributes;
   (b) associating at least one of the roles to a data item; and
   (c) assigning the data item a value for each of the attributes of the one or more roles associated with the data item.

2. A method as recited in claim 1, wherein the data item has at least one attribute associated therewith prior to the associating of the one or more roles to the data item.

3. A method as recited in claim 2, wherein associating of one or more roles to the data item further comprises determining whether the data item has one or more attributes in common with the set of attributes of the role.

4. A method as recited in claim 3, wherein assigning the data item a value for each of the attributes of the one or more roles associated with the data item further comprises assigning at least one value for each attribute of the set of attributes of the role that the data item does not include.

5. A method as recited in claim 1, wherein the set of attributes of the role include one or more values indicative of properties of the data item.

6. A method as recited in claim 1, further comprising permitting the addition of one or more attributes to the data item.

7. A method as recited in claim 1, wherein the data item has at least one attribute not included in the set of attributes of the one or more roles associated with the data item.

8. A method as recited in claim 1, wherein at least two of the roles share a common attribute.

9. A method as recited in claim 1, wherein associating one or more of the roles to the data item further comprises creating an alias for at least one of the attributes of the set of attributes of the role.

10. A method as recited in claim 1, further comprising storing the values assigned to the data item in a database.

11. A method as recited in claim 10, further comprising retrieving the values of all of the attributes of a role upon receipt of a query for one of the attributes of the respective role.

12. A computer program embodied on a computer readable medium for managing a data item, comprising:
   (a) a code segment that defines one or more roles, wherein each role comprises a set of attributes;
   (b) a code segment that associates at least one of the roles to a data item; and
   (c) a code segment that assigns the data item a value for each of the attributes of the one or more roles associated with the data item.

13. A computer program as recited in claim 12, wherein the data item has at least one attribute associated therewith prior to the associating of the one or more roles to the data item.

14. A computer program as recited in claim 13, wherein the code segment that associates of one or more roles to the data item further comprises a code segment that determines whether the data item has one or more attributes in common with the set of attributes of the role.

15. A computer program as recited in claim 14, wherein the code segment that assigns th e data item a value for each of the attributes of the one or more roles associated with the data item further comprises a code segment that assigning at least one value for each attribute of the set of attributes of the role that the data item does not include.

16. A computer program as recited in claim 12, wherein the set of attributes of the role include one or more values indicative of properties of the data item.

17. A computer program as recited in claim 12, further comprising a code segment that permits the addition of one or more attributes to the data item.

18. A computer program as recited in claim 12, wherein the data item has at least one attribute not included in the set of attributes of the one or more roles associated with the data item.

19. A computer program as recited in claim 12, wherein at least two of the roles share a common attribute.

20. A system for managing a data item, comprising:
   (a) logic that defines one or more roles, wherein each role comprises a set of attributes;
   (b) logic that associates at least one of the roles to a data item; and
   (c) logic that assigns the data item a value for each of the attributes of the one or more roles associated with the data item.

* * * * *